United States Patent

[11] 3,548,877

| [72] | Inventor | Hansruedi Aumayer<br>Suhr, Switzerland |
|---|---|---|
| [21] | Appl. No. | 825,563 |
| [22] | Filed | May 19, 1969 |
| [45] | Patented | Dec. 22, 1970 |
| [73] | Assignee | I-T-E Imperial Corporation<br>Philadelphia, Pa.<br>a corporation of Delaware |

[54] HIGH SPEED THREE-WAY VALVE
4 Claims, 7 Drawing Figs.

[52] U.S. Cl. .................................................137/625.65,
251/137, 251/282; 335/183, 335/266
[51] Int. Cl. .......................................................F16k 11/02,
F16k 39/00
[50] Field of Search........................................... 251/137,
282; 335/183, 266; 137/625.65, 625.66, 625.68

[56] References Cited
UNITED STATES PATENTS

| 3,107,692 | 10/1963 | Forwald | 137/625.66 |
| 3,178,151 | 4/1965 | Caldwell | 251/137 |
| 3,302,144 | 1/1967 | Jensen | 335/183 |
| 3,383,084 | 5/1968 | Mayfield | 251/137X |

*Primary Examiner*—Henry T. Klinksiek
*Attorney*—Ostrolenk, Faber, Gerb and Soffen ABSTRACT: A high speed valve is formed of a hollow, cylindrical sleeve member which moves between two spaced, coaxial sealing rings. The cylindrical valve is connected to an operating piston. A source of high pressure is connected to an annular region surrounding the cylindrical valve, and a cylinder port which is to be connected to high pressure or exhaust pressure is disposed in communication with the top of the sleeve and is isolated from the high pressure source when the sleeve is closed against the first seal. An exhaust port is disposed adjacent the second seal so that movement of the hollow, cylindrical sleeve between its upper and lower positions connects the operating cylinder alternately to either the high pressure source or the exhaust port. The sleeve is flared outwardly so that differential pressure tends to hold the sleeve against either the first or second valve seal when the sleeve reaches such a position.

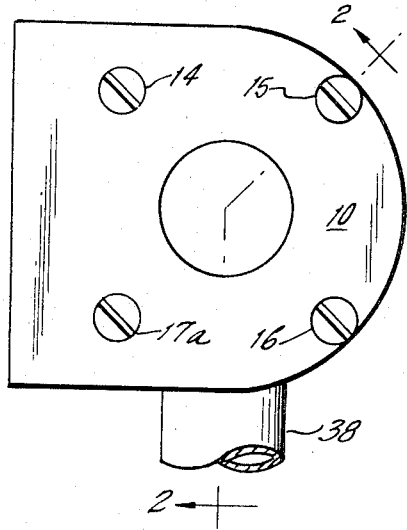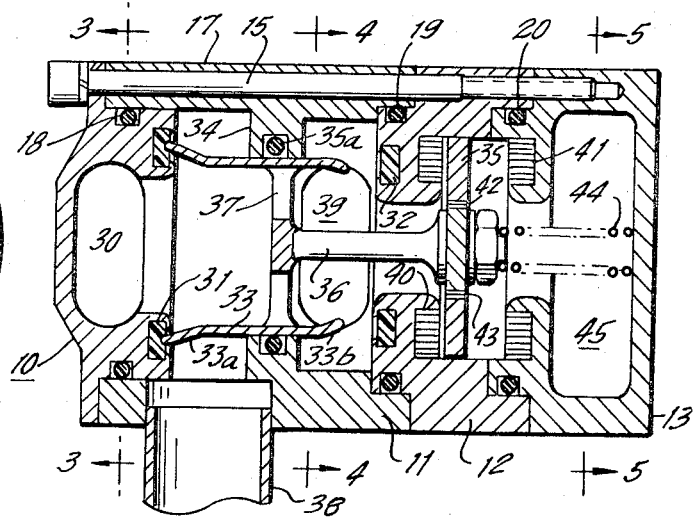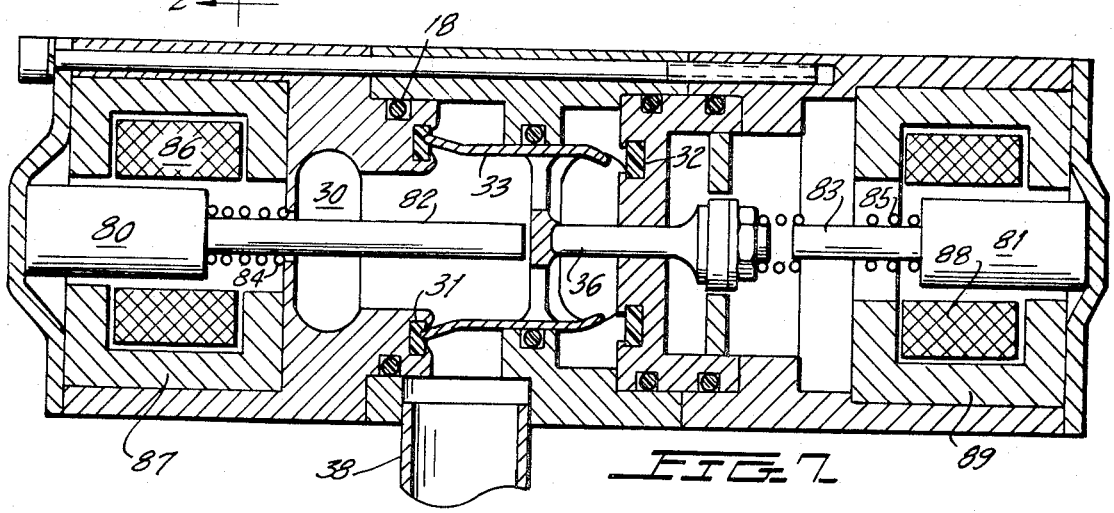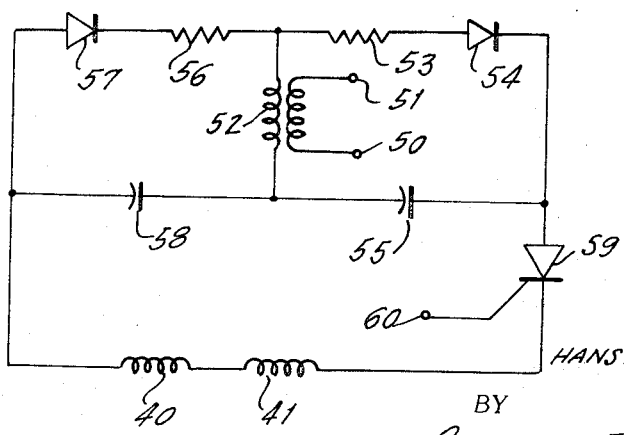

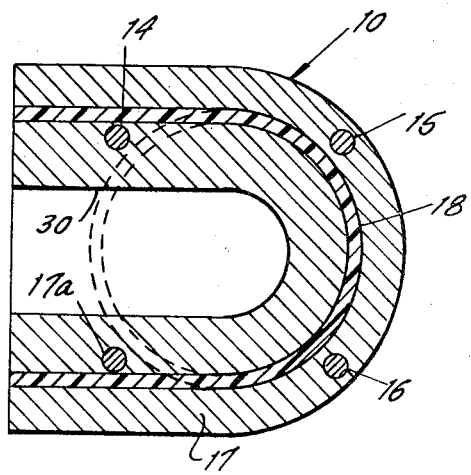
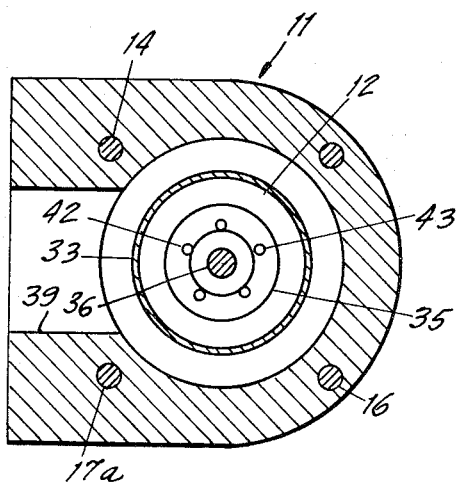
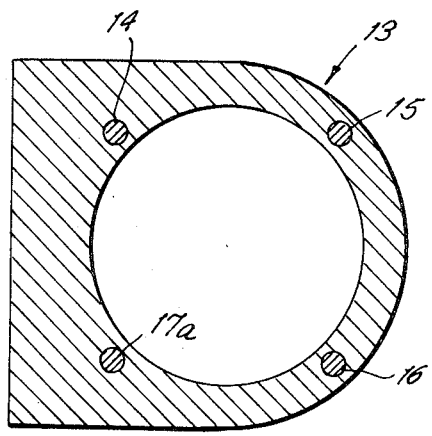

HIGH SPEED THREE-WAY VALVE

This invention relates to valve structures, and more particularly relates to a novel high speed three-way valve in which a pneumatic conduit can be quickly connected to either a high pressure source or an exhaust port.

Apparatus of this type will have various applications in which high pressure is to be connected to and removed from a particular conduit. Typical of these applications would be in the circuit interruption field in which an electrical contact is moved between an engaged and disengaged position with a cooperating contact by the application of pneumatic pressure to the contact.

The present invention provides a novel configuration for a valve which includes a hollow, sliding sleeve movable between two spaced sealing rings. When the sleeve is in a first sealing position, a pressure connection is formed between the cylinder port and an exhaust port so that the cylinder port is connected, for example, to atmospheric pressure. When, however, the valve sleeve moves to the second sealing ring, the high pressure port is connected to the cylinder port, with the application of high pressure to the cylinder port occurring in an extremely short time after reception of an operating impulse. In order to insure high speed operation, the valve sleeve is connected to piston which moves between spaced electrodynamic coils in the manner described in U.S. Pat. No. 26,445 in the name of Otto Jensen, assigned to the assignee of the present invention. Alternatively, the piston can be operated by impulses from a solenoid magnetic system. This piston plays a further part in the operation of the valve system, whereby, when the sleeve is in one of its positions, high pressure is applied to the piston to hold the sleeve in this sealing position. A portion of the valve is then tapered outwardly in a novel manner so that when the sleeve is in the other sealing position, the sleeve will be held in such a position due to differential pressure applied against the outwardly tapering configuration.

Accordingly, a primary object of this invention is to provide a novel high speed three-way valve in which the total valve operating time when switching a conduit from a relatively low pressure condition to a relatively high pressure condition is less than 10 milliseconds.

Another object of this invention is to provide a novel high speed valve which is simple in construction and highly reliable.

These and other objects of this invention will become apparent from the following description taken in connection with the drawings in which:

FIG. 1 is a top view of the valve structure housing of a valve constructed in accordance with the present invention.

FIG. 2 is a cross-sectional view of FIG. 1 taken across the section line 2–2 in FIG. 1.

FIG. 3 is a cross-sectional view of FIG. 2 when taken across the section line 3–3 in FIG. 2.

FIG. 4 is a cross-sectional view of FIG. 2 taken across the section line 4–4 in FIG. 2.

FIG. 5 is a cross-sectional view of FIG. 2 taken across the section line 5–5 in FIG. 2.

FIG. 6 shows a circuit diagram for operating the valve of FIGS. 1 to 5.

FIG. 7 shows a second embodiment of the valve structure of the present invention which uses a solenoid system in place of an electrodynamic drive system.

Referring first to FIGS. 1 to 5, it will be seen that the novel valve structure consists of a stack of plates 10, 11, 12, and 13 which are held together by a plurality of bolts such as bolts 14, 15, 16 and 17a. Plate 10 is further shown in FIGS. 1 and 3; plate 11 is shown in cross section in FIG. 4; and plate 13 is shown in cross section in FIG. 5.

Plate 11 has an external cylindrical wall portion, best shown in FIG. 2 as wall portion 17, the interior left-hand end surface of which is sealed to the reduced diameter portion of plate 10 by the gasket 18. The right-hand end of cylindrical wall portion 17 is connected to and sealed to plate 12 by gasket 19, and nests with respect to a reduced diameter portion on plate 13. Plates 12 and 13 are sealed to one another through the O-ring seal 20.

If desired, gasket 18 may be circular, as shown in dotted lines in FIG. 3, where, however, the gasket 18 is moved further to the right in FIG. 2 so that it will not interfere with flow of fluid in channel 30.

Plate 10 is then formed with a U-shaped opening 30 which extends to the exterior of the valve structure. Opening 30 is connectable in any desired manner to some pressure conduit which is to be connected either to high pressure or is to be exhausted to ambient, or some other pressure source.

The right-hand surface of plate 10 in FIG. 2 then receives the upper circular sealing ring 31 which will be described more fully hereinafter. A lower circular valve seal 32 is then secured in the left-hand surface of plate 12, as shown in FIG. 2. A cylindrical valve sleeve 33 which is axially movable between valve seals 31 and 32 is mounted within inwardly extending web 34 of plate 11 and within seal ring 35a carried on the interior of web 34.

A piston 35 is then connected to the sleeve 33 by connection rod 36 secured to spider 37 of sleeve 33. High pressure conduit 38 is then connected into a suitable opening in cylindrical extension wall 17 of plate 11. The right-hand cylindrical extension of plate 11 contains an exhaust channel 39 (FIGS. 2 and 4) which exhausts to ambient or to some pressure other than the high pressure connected to conduit 38.

The right-hand surface of plate 12 then contains a spiral electrical winding 40, while the left-hand side of plate 13 contains a spiral winding 41 to form the windings of an electrodynamic drive system. Piston 35 is constructed of a conductive material such as copper so that the piston acts as a short-circuited winding positioned between two windings 40 and 41, thereby to define an electrodynamic drive system of the type described in the previously referred to U.S. Pat. No. re 26,445.

The piston 35 is provided with a plurality of openings for exhaust ports of a small diameter such as the openings 42 and 43. A biasing spring 44 is then connected to the bottom of piston 35 and biases the piston to the left in FIG. 2 with the spring 44 being received in a relatively large closed chamber 45 formed within plate 13.

The coils 40 and 41 of FIG. 2 are schematically shown in FIG. 6 along with an electrical drive circuit which could be of any desired type. In FIG. 6, however, an AC source is connected to terminals 50 and 51, with these terminals connected to the primary winding of a suitable transformer 52. The transformer secondary winding is then connected in series with a resistor 53 and rectifier 54 which charge capacitor 55 and in series with a second resistor 56 and a second diode 57 which charges a second capacitor 58. Capacitors 55 and 58 are energy storage capacitors, and are connected in series with the main electrode of a suitable controlled rectifier or other switching device 59 and the two coils 40 and 41. Any suitable firing circuit is then connected to the gate terminal 60 of controlled rectifier 59 in order to discharge charged capacitors 55 and 58 through the series connected coils 40 and 41.

The operation of the system of FIGS. 1 to 6 is described in the following:

With the valve sleeve 33 in the position shown, the cylinder 30 is connected directly to the exhaust port 39 so that, if exhaust port 39 is connected to ambient pressure, cylinder 30 will also be ambient pressure. Note that sleeve 33 has conical end sections 33a and 33b. The high pressure of conduit 38 bearing against the outwardly flaring conical section 33a of sleeve 33 will define a differential pressure which tends to force sleeve 33 into engagement with seal 31.

If it is now desired to apply high pressure from conduit 38 to the port 30, the circuit of FIG. 6 is activated by firing controlled rectifier 59, thereby discharging the capacitors 55 and 58 into the series connected coils 40 and 41.

Since the piston 35 is immediately adjacent coil 40, a strong force of repulsion is created between coil 40 and the piston 35, which acts like a short-circuited winding, so that the piston 35 is rapidly moved to the right in FIG. 2. This causes immediate opening or "cracking" of the valve seal 31 with the right-hand end of sleeve 33 very quickly engaging seal 32. The high pressure of conduit 38 is now applied to piston 35 and to the interior surface of the inwardly directed conical end portion 33b. The differential pressure on this inwardly end portion of sleeve 33 moves sleeve 33 quickly to the right in FIG. 2 and maintains the sleeve 33 in its engaged position with respect to valve seat 32, with the pressure appearing on the piston 35 being gradually equalized through the pressure relief ports 42 and 43 and until the chamber 45 reaches the pressure of the high pressure conduit 38. The high pressure of conduit 38 is now applied directly to cylinder 30, while the engagement between seal 32 and the right-hand end of sleeve 33 prevents application of such high pressure to the exhaust port 39.

In order to operate the valve back to the position of FIG. 2, the impulse coil system of FIG. 6 is reenergized so that a sharp impulse current flows through series coils 40 and 41. Since the short-circuited turn or piston 35 is now adjacent winding 31, the strong repulsive forces will be set up between these two windings to move sleeve 33 to the left and opening seal 32. This exhausts the high pressure within sleeve 33 through port 39 so that the high pressure in chamber 45 against piston 35 creates a high differential pressure to move piston 35 into engagement with seal 31. Once the sleeve 33 seals against the seal ring 31, it is held in this position by the differential pressure due to the high pressure on the exterior of sleeve 33a.

Note that if there is a failure of the high pressure in conduit 38, or if this high pressure is removed, the spring 44 will maintain the sleeve 33 in the position shown in FIG. 2.

As pointed out previously, the above noted novel valve has an exceptionally high speed of operation and can be less than 10 milliseconds. This extremely high speed is obtained by using high differential pressures for actual movement of the sleeve 33 after the electrodynamic drive system is operated to "crack" the valve seat. Thus, when the valve sleeve is to move from left to right in FIG. 2 and immediately after the "cracking" of seal 31, high differential pressure is applied from the high pressure source 38 to conically tapered surfaces 33a and 33b of sleeve 33. Since the movable mass is relatively low in the novel valve of the invention, extremely high speed movement is obtained for sleeve 33 in moving toward the seal 32. Moreover, the differential pressures maintain the sleeve in its sealed position against seal 32.

In moving the sleeve 33 from right to left in FIG. 2, applicant again obtains the advantage of the high differential pressure immediately following the "cracking" of seal 32 which operates to exhaust the pressure from the left-hand surface of piston 35 so that the relatively high pressure in chamber 45 drives the piston 35 and sleeve 33 to the left with great speed in sealing engagement with valve seal 31.

It will be apparent to those skilled in the art that while the conduit 38 has been described as the high pressure conduit and the conduit 39 the exhaust conduit and conduit 30 as the conduit to which pressures are controllably connected, the function of these various conduits can be exchanged.

Referring next to FIG. 7, the valve shown therein is essentially the same as the valve of the embodiment of FIGS. 1 to 5, and similar identifying numerals have been applied to similar components. In FIG. 7, however, the impulse coil operating system is replaced by a solenoid actuating system. Thus, solenoid plungers 80 and 81 are provided with extending shafts 82 and 83, respectively. Each of plungers 80 and 81 are biased toward their respective end of the valve by springs 84 and 85, respectively. Plunger 80 is surrounded by a winding 86 and a magnet structure 87, while plunger 81 is surrounded by a winding 88 and magnetic structure 89. The end of shaft 82 is spaced from the center of spider 37, while the end of shaft 83 is spaced from the right-hand end of shaft 36.

In operation, energization of either winding 86 or 88 will drive extension 82 or 83 to create a "hammer-blow" on valve 33 to crack either valve seat 31 or valve seat 32, respectively. The operation of the valve is then identical to that described for the valve of FIGS. 1 to 5.

The valve of the present invention is a three-way valve useful, for example, for pressurizing or exhausting one side of a piston moving in a cylinder. A "four-way" valve system can be provided by using two valves of the type shown herein which are applied to opposite sides of such a piston, thereby to fully control the movement of such a piston between two end positions.

Although this invention has been described with respect to particular embodiments, it should be understood that many variations and modifications will now be obvious to those skilled in the art, and, therefore, the scope of this invention is limited not by the specific disclosure herein, but only by the appended claims.

I claim:
1. A high speed valve comprising, in combination:
   a. a valve housing;
   b. a hollow axially movable sleeve slidably movable within said housing and having a first outwardly tapering end and a second inwardly tapering end;
   c. first and second annular valve seals mounted within said housing which are concentric with one another and with said movable sleeve, and disposed at opposite ends of said sleeve; said first and second annular valve seals spaced from one another by a distance greater than the length of said sleeve; said first and second ends of said sleeve being engageable with said first and second seals, respectively;
   d. a first pressure conduit communicating with the interior of said first annular seal;
   e. a second pressure conduit communicating with a volume external of said first end of said sleeve;
   f. a third pressure conduit communicating with a volume external of said second end of said sleeve;
   g. and operating means connected to said sleeve for moving said sleeve between said first and second annular valve seals, thereby to connect together said second and third pressure conduits and said first and second pressure conduits, respectively;
   h. at least one of said first, second and third pressure conduits having a higher pressure than the others, thereby establishing a differential pressure on said sleeve to maintain said sleeve in engagement with either of said first or second annular valve seals.

2. The high speed valve of claim 1 which further includes a piston disposed in said housing and concentric with an connected to said sleeve; one side of said piston communicating with the interior of said second sleeve; the other side of said piston communicating with a pressurizable volume; and leakage openings in said piston; whereby differential pressure on said piston moves said sleeve between said first and second seals at high pressure after the seal at said first and second seals is initially broken by movement of said sleeve by said operating means.

3. The high speed valve of claim 2 wherein said operating means consists of first and second energizable windings disposed on opposite sides of said piston; said piston formed of electrically conductive material and acting as the movable winding of an electrodynamic drive system.

4. The high speed winding of claim 3 wherein said second pressure conduit is connected to high pressure.